United States Patent Office 3,243,439
Patented Mar. 29, 1966

3,243,439
BENZOTHIEPIN OXAZOLES
Richard J. Mohrbacher, Fort Washington, and Elizabeth L. Carson, Lansdale, Pa., assignors to McNeil Laboratories, Incorporated, a corporation of Pennsylvania
No Drawing. Filed June 24, 1965, Ser. No. 466,854
8 Claims. (Cl. 260—307)

This invention relates to novel benzothiepin derivatives. More particularly, it concerns benzothiepin oxazoles having the formula

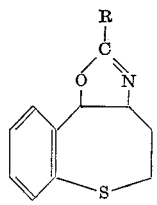

wherein R is a member selected from the group consisting of amino, loweralkylamino and diloweralkylamino; and the nontoxic acid addition salts thereof.

As used herein, loweralkyl may be straight or branch chained and have from 1 to 6 carbon atoms, such as, for example, methyl, ethyl, propyl, isopropyl, butyl, isobutyl, tertiary butyl and the like.

The therapeutically active non-toxic acid addition salts of these compounds are prepared by treatment with an appropriate acid such as an inorganic acid, e.g., hydrochloric, hydrobromic, hydriodic, sulfuric, nitric or phosphoric; an organic acid such as acetic, propionic, glyolic, lactic, pyruvic, malonic, succinic, maleic, malic, fumaric, tartaric, citric, benzoic, mandelic, cinnamic, methane sulfonic, benzene sulfonic, salicyclic, 2-phenoxybenzoic. Conversely, the salt form may be converted in the usual manner into the free base.

The compounds of this invention have valuable pharmacological properties in view of their central nervous system depressant activities.

The compounds of this invention wherein R is amino is prepared by reacting 4-amino-2,3,4,5-tetrahydro-1-benzothiepin-5-ol with cyanogen bromide, preferably by adding the 4-amino-2,3,4,5-tetrahydro-1-benzothiepin-5-ol to a solution of cyanogen bromide in a suitable solvent such as an alkanol, for example, methanol, in the presence of sodium acetate while the cyanogen bromide solution is cooled.

An alternate method of preparing the 2-amino-3a,4,5,10b-tetrahydro-1-benzothiepin[4,5-d]oxazoles and a method of preparing the 2-alkylamino- and 2-dialkylamino - 3a,4,5,10b-tetrahydro - 1-benzothiepin[4,5-d] oxazoles involves cyclizing an appropriately substituted hydroxy urea by a displacement reaction following treatment with a suitable reagent. The latter preferably is thionyl chloride, although other reagents which will convert an hydroxy group to a displaceable function such as hydrohalic acids, e.g., hydrochloric acid, hydrobromic acid or hydriodic acid; p-toluenesulfonyl chloride or methanesulfonyl chloride may be employed. The reaction is advantageously conducted in the presence of an inert organic solvent; preferably methylene chloride, or other halogenated hydrocarbons such as chloroform or carbon tetrachloride; benzene or toluene. Equimolar quantities of reactants are preferred, the mixture being heated or allowed to stand at room temperature until the reaction is complete, i.e., the hydroxyl group has been converted to a displaceable group. The halogenated or esterified compound is concentrated, added to boiling water and heated to effect cyclization, giving the desired 2-substituted - 3a,4,5,10b-tetrahydro - 1-benzothiepin[4,5-d]oxazoles.

For the preparation of the intermediate hydroxy ureas, 4-amino-2,3,4,5-tetrahydro-1-benzothiepin-5-ol is reacted with cyanic acid to produce the unsubstituted hydroxy urea or with an appropriate isocyanate or dialkylcarbamyl halide to produce the mono or dialkyl urea. In the reaction with cyanic acid, the amino-alcohol as its hydrohalide acid addition salt or with an equivalent amount of strong acid is combined with an equivalent quantity of an alkali metal cyanate such as potassium cyanate in a polar solvent such as water, a lower alknol or the like. The reaction occurs readily at ordinary temperatures and the product can be isolated by conventional techniques such as filtration, extraction and the like. The mono or dialkyl ureas can be obtained by reacting the amino-alcohol with an alkyl isocyanate such as methyl isocyanate or propyl isocyanate in a non-hydroxylic solvent such as methylene chloride, benzene and the like or with a dialkylcarbamyl halide such as dimethylcarbamyl chloride or diethylcarbamyl chloride, preferably in the presence of a base such as sodium hydroxide, potassium carbonate and the like or pyridine, triethylamine or other tertiary organic bases.

The following examples are intended to illustrate, but not to limit, the scope of the present invention.

Example I

A solution of 11.2 g. (0.16 mole) of hydroxylamine hydrochloride in 16 ml. of water is added to a stirred slurry of 17.8 g. (0.1 mole) of 3,4-dihydro-1-benzothiepin-5(2H)-one in 60 ml. of 95% ethanol. Aqueous potassium hydroxide (15.7 g., 0.28 mole of potassium hydroxide in 15.7 ml. of water) is then added and the slurry is heated under reflux for 2 hours, cooled, poured into ice water and acidified with concentrated hydrochloric acid. White crystals form. The crystals are recovered by filtration. Three recrystallizations from 95% ethanol yield white crystals of 3,4-dihydro-1-benzothiepin-5(2H)-one oxime; M.P. 97–99° C.

Example II

A solution of 78.5 g. (0.413 mole) of freshly recrystallized p-toluenesulfonyl chloride in 120 ml. of pyridine is added in a period of 5 minutes to a stirred solution of 78 g. (0.4 mole) of 3,4-dihydro-1-benzothiepin-5(2H)-one oxime previously cooled in an ice-salt bath. After the 5 minutes addition, the mixture is stirred for 15 minutes in an ice-salt bath and then placed in a freezer for 18 hours. The iced solution is poured into ice water and the gum that forms is extracted into ether. The aqueous layer is extracted several times with ether and benzene. All the organic solutions are combined and dried in a refrigerator. The solution is concentrated in vacuo below 20° C. to give an orange-red oil; O-p-tosyl-3,4-dihydro-1-benzothiepin-5(2H)-one oxime.

Example III

Potassium (15.6 g.) is dissolved in 200 ml. of absolute ethanol and the resulting solution is added over 15 minutes to an iced, stirred solution of about 0.4 mole of O-p-tosyl - 3,4-dihydro - 1-benzothiepin-5(2H)-one oxime in 450 ml. of ethanol. Crystals form immediately. After the addition of 60 ml. of ethanol, the slurry is stirred for 45 minutes at ice-bath temperature and is then allowed to warm slowly to room temperature during 2 hours. The potassium tosylate is removed by filtration. The filtrate is diluted with 230 ml. of 2N hydrochloric acid and 500 ml. of ether and is then refrigerated. Crystals are removed by filtration. Concentration of the filtrate and then dilution with ether yields another batch of crystals. Three recrystallizations from alcohol produces white crystals of 4-amino-3,4-dihydro-1-benzothiepin-5(2H)-one hydrochloride; M.P. 238° C.

*Example IV*

A hot solution of 4-amino-3,4-dihydro-1-benzothiepin-5(2H)-one hydrochloride (12.7 g., 0.055 mole) in 700 ml. of 2-propanol-methanol is added to a stirred solution of sodium borohydride (8.3 g., 0.22 mole) in 500 ml. of 2-propanol. The slurry is stirred for 18 hours at room temperature. After the addition of 30 ml. of water, the solution is concentrated in vacuo. The residue is dissolved in 125 ml. of 3 M hydrochloric acid and the hydrochloride salt is removed by filtration. The filtrate is extracted 3 times with benzene-ether to remove non-basic material. The aqueous layer is made basic and extracted with methylene chloride. A golden oil is obtained after drying and concentration of the methylene chloride solution. Conversion of the oil, in methanol solution, to the hydrochloride salt, by treatment with ethereal hydrogen chloride and five recrystallizations from 2-propanol-methanol produces white crystals of 4-amino-2,3,4,5-tetrahydro - 1-benzothiepin - 5-ol hydrochloride; M.P. 269–270° C.

*Example V*

To a stirred solution of 6.1 g. (0.0575 mole) of cyanogen bromide in 60 ml. of methanol, cooled in an ice salt bath, is added dropwise a solution of sodium acetate (4.7 g., 0.0575 mole) and 4-amino - 2,3,4,5-tetrahydro-1-benzothiepin-5-ol (10.2 g., 0.052 mole) in 60 ml. of methanol. The ice bath is removed and the stirred solution is slowly warmed to room temperature over 3 hours. After concentration to dryness in vacuo below 50° C., the residue is dissolved in a solution of potassium carbonate and is then extracted into ether. The organic layer is washed with water and brine and dried over magnesium sulfate. After concentration in vacuo, the residue is dissolved in alcohol. Ethereal hydrogen chloride is added to give white crystals which are recrystallized 3 times from methanol to give the hydrochloride salt; 2-amino-3a,4,5,10b-tetrahydro - 1-benzothiepin[4,5-d]oxazole hydrochloride; M.P., 246–247° C.

*Example VI*

A solution of 19.5 g. (0.10 mole) of 4-amino-2,3,4,5-tetrahydro-1-benzothiepin-5-ol in 200 ml. of methylene chloride is cooled to 0° C. and treated with stirring with a solution of 5.7 g. (0.10 mole) of methylisocyanate in 10 ml. of methylene chloride. After stirring for 2 hours at room temperature, the reaction mixture containing 1-[5-hydroxy - 4-(2,3,4,5-tetrahydro-1-benzothiepinyl)]-3-methyl urea is treated with a solution of 11 g. (0.10 mole) of thionyl chloride in 20 ml. of methylene chloride. The mixture is heated at reflux for 30 minutes and then evaporated to dryness. The residual 1-[5-chloro - 4 - (2,3,4,5 - tetrahydro - 1 - benzothiepinyl)]-3-methyl urea is then dissolved in boiling water. The aqueous solution is filtered, cooled and made basic with potassium carbonate solution. Extraction of the separated product into methylene chloride followed by drying and removal of solvent provides 2-methylamino-3a,4,5,10b-tetrahydro-1-benzothiepin[4,5-d]oxazole.

*Example VII*

A solution of 10.8 g. (0.10 mole) of dimethylcarbamyl chloride in 100 ml. of chloroform is added slowly to a cold, rapidly stirring mixture of 19.5 g. (0.10 mole) of 4-amino - 2,3,4,5-tetrahydro - 1-benzothiepin-5-ol in 67 ml. (0.20 mole) of 12% sodium hydroxide solution. The mixture is stirred at ice bath temperatures for 4 hours, the layers are separated and the aqueous layer is extracted with chloroform. The combined organic solution is washed with saturated brine and dried over anhydrous magnesium sulfate. Evaporation of the solvent under reduced pressure gives 1-[5-hydroxy-4-(2,3,4,5-tetrahydro-1-benzothiepinyl)]-3,3-dimethyl urea.

A solution of this product in methylene chloride is treated with 11 g. (0.10 mole) of thionyl chloride as described in the previous example. Reaction of the resulting 1-[5-chloro-4-(2,3,4,5-tetrahydro-1-benzothiepinyl)]-3,3-dimethyl urea with boiling water as described in the previous example provides 2-dimethylamino-3a,4,5,10b-tetrahydro-1-benzothiepin[4,5-d]oxazole.

*Example VIII*

Using the procedure of Example VI and replacing methylisocyanate with equivalent amounts of ethylisocyanate and butylisocyanate, the products obtained are 2-ethylamino-3a,4,5,10b-tetrahydro-1-benzothiepin[4,5-d]oxazole and 2-butylamino-3a,4,5,10b-tetrahydro-1-benzothiepin[4,5-d]oxazole.

*Example IX*

Using the procedure of Example VII and replacing dimethylcarbamyl chloride with equivalent amounts of diethylcarbamyl chloride and dibutylcarbamyl chloride, the products obtained are 2 - diethylamino - 3a,4,5,10b-tetrahydro - 1-benzothiepin[4,5-d]oxazole and 2-dibutylamino-3a,4,5,10b-tetrahydro-1-benzothiepin[4,5]oxazole.

What is claimed is:

1. A member selected from the group consisting of benzothiepin oxazoles having the formula

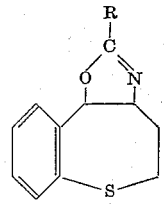

wherein R is a member selected from the group consisting of amino, loweralkylamino and diloweralkylamino; and the non-toxic acid addition salts thereof.

2. 2-amino - 3a,4,5,10b - tetrahydro - 1-benzothiepin [4,5-d]oxazole.

3. 2-dimethylamino-3a,4,5,10b-tetrahydro-1-benzothiepin[4,5-d]oxazole.

4. 2-diethylamino - 3a,4,5,10b-tetrahydro - 1-benzothiepin[4,5-d]oxazole.

5. 2-methylamino - 3a,4,5,10b-tetrahydro - 1-benzothiepin[4,5-d]oxazole.

6. 2-ethylamino - 3a,4,5,10b-tetrahydro - 1-benzothiepin [4,5-d]oxazole.

7. 2-butylamino - 3a,4,5,10b-tetrahydro - 1-benzothiepin[4,5-d]oxazole.

8. 2-dibutylamino - 3a,4,5,10b-tetrahydro - 1-benzothiepin[4,5-d]oxazole.

No references cited.

NICHOLAS S. RIZZO, *Primary Examiner.*